United States Patent [19]
Arnaudeau

[11] 4,310,335
[45] Jan. 12, 1982

[54] METHOD AND APPARATUS FOR CONVEYING THROUGH A PIPE A DIPHASIC FLUID OF HIGH FREE GAS CONTENT

[75] Inventor: Marcel Arnaudeau, Paris, France

[73] Assignee: Institut Francais du Petrole, Rueil-Malmaison, France

[21] Appl. No.: 58,336

[22] Filed: Jul. 17, 1979

Related U.S. Application Data

[63] Continuation-in-part of Ser. No. 16,467, Mar. 1, 1979, abandoned.

[51] Int. Cl.³ .............................................. B01D 47/00
[52] U.S. Cl. ...................................... 55/46; 55/203; 55/210; 137/13; 137/14; 137/599; 137/100; 417/53; 366/152; 366/160; 261/64 B; 261/66; 261/19
[58] Field of Search .................. 55/23, 36, 40, 41, 43, 55/44, 151, 159, 203, 46, 210; 417/313, 54, 53; 166/267; 175/69; 62/41, 17; 366/152, 160; 137/13, 14, 59, 100; 261/64 B, 66, 19; 426/312, 477

[56] References Cited

U.S. PATENT DOCUMENTS

| | | | |
|---|---|---|---|
| 1,873,045 | 8/1932 | Saathoff | 137/13 |
| 3,255,575 | 6/1966 | Roberts | 55/46 |
| 3,344,583 | 10/1967 | Styring | 55/44 |
| 3,486,297 | 12/1969 | Eisinger | 55/46 |
| 3,548,846 | 12/1970 | Allen | 137/13 |
| 3,885,935 | 5/1975 | Nuttler | 55/457 |

FOREIGN PATENT DOCUMENTS

| | | | |
|---|---|---|---|
| 2105926 | 10/1971 | Fed. Rep. of Germany | 55/204 |
| 2134520 | 12/1972 | France | 55/457 |

*Primary Examiner*—Bernard Nozick
*Attorney, Agent, or Firm*—Millen & White

[57] ABSTRACT

A method and device for conveying a diphasic fluid of high free gas content through a pipe includes separating a liquid of reduced free gas content from the diphasic fluid. The pressure of the separated liquid and the remaining gas are separately simultaneously increased to the same value and at least some of the increased pressure gas is remixed with the increased pressure liquid to obtain a new fluid of reduced free gas content. This new fluid is then introduced and conveyed through a pipe. Alternatively the steps of the method can be repeated before introducing the new fluid into the pipe for further reducing the free gas content thereof.

9 Claims, 8 Drawing Figures

METHOD AND APPARATUS FOR CONVEYING THROUGH A PIPE A DIPHASIC FLUID OF HIGH FREE GAS CONTENT

CROSS REFERENCE TO RELATED APPLICATIONS

This application is a continuation-in-part of application Ser. No. 16,467 filed Mar. 1, 1979 now abandoned and it also relates to application Ser. No. 11,818 filed Feb. 13, 1979.

BACKGROUND OF THE INVENTION

The present invention relates to a method and device for conveying through a pipe a diphasic fluid of high free gas content.

In the following, reference is made, by way of non limitative example, to the application of the invention to the complete recovery of petroleum effluents from an oil producing field.

Petroleum effluents from an oil producing field often comprise a liquid and a gas phase. When the gas content reaches 10 to 20% of the liquid content, which corresponds to a high volumetric gas/oil ratio, it is not possible to increase the pressure of the gas-liquid mixture with presently available pumping equipments and it becomes necessary to separate the liquid phase from the gas phase and to process them separately.

Such separation is achieved in one or more chambers by progressively reducing the pressure of the gas-liquid mixture to atmospheric pressure. Pumps are used to increase separately the liquid pressure to force it into the pipe or pipes provided therefore. The gas phase, which is separately processed, is either burnt in flares, i.e. without power recovery, or sometimes used to produce a part of the power required for actuating the oil field equipments or reinjected into the oil containing geological formations so as to increase the efficiency of oil recovery from these formations.

The gas phase is rarely liquefied or conveyed through a separate line, since this would require very expensive investments which, up to now, appear little or not at all profitable.

Not only the gas which is simultaneously produced with the liquid phase is practically never recovered, but separation of the gas and liquid phases requires a bulky equipment, which is a serious drawback in the case of offshore oil producing fields and requires a non negligible power consumption for increasing again the gas pressure which has been reduced during the gas-liquid separation.

SUMMARY OF THE INVENTION

An object of the present invention is to obviate or at least reduce these drawbacks by providing a method permitting the recovery of the greatest part of the petroleum effluents from an oil field, and the conveyance of both gas and liquid phases through one and the same pipe.

The apparatus for carrying out the method according to the invention has the advantage of being compact, which facilitates its application to offshore oil production equipments.

BRIEF DESCRIPTION OF THE DRAWING

The invention will be better understood and all the advantages thereof made apparent from the following description illustrated by the accompanying drawings, wherein.

DETAILED DESCRIPTION OF THE PREFERRED EMBODIMENTS

Figure 1:
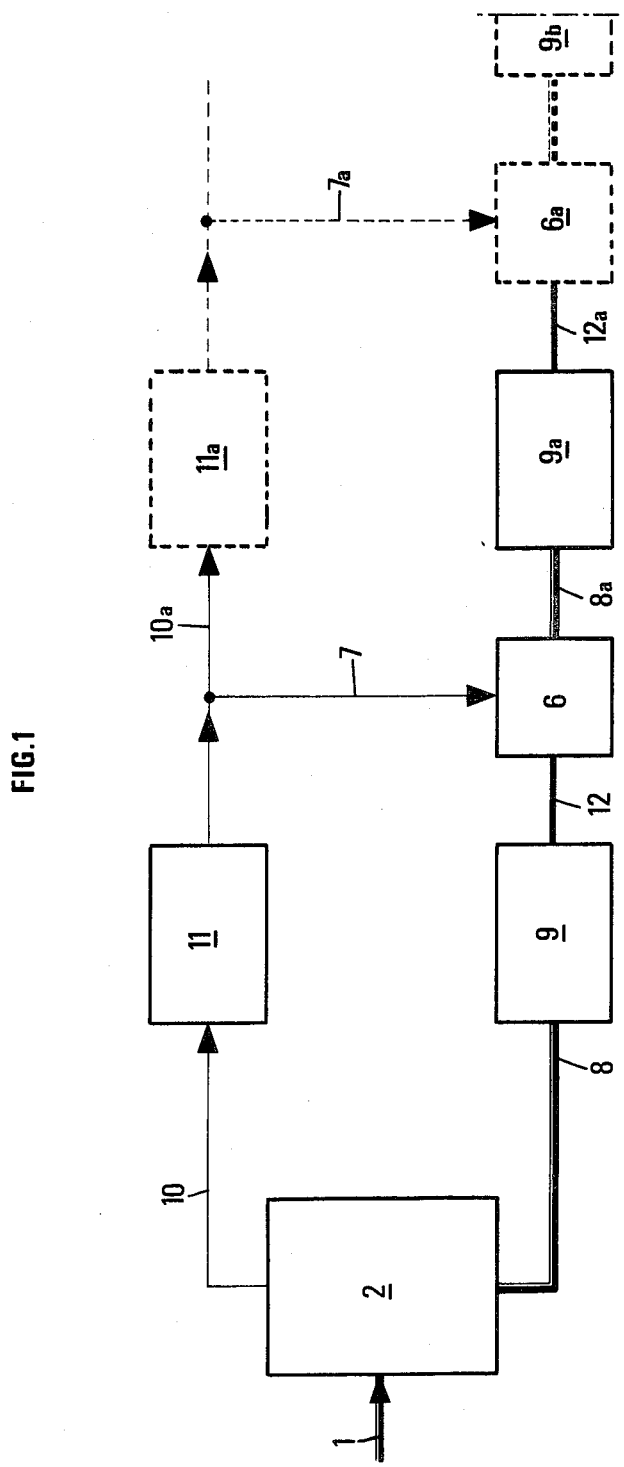
FIG. 1 diagrammatically illustrates the whole device for carrying out the method according to the invention.

In FIG. 1, reference numeral 1 designates the pipe which is fed with a fraction of or with the entire oil effluent, under pressure, from the oil producing field, this effluent comprising a liquid and a gas phase in a volumetric gas/liquid ratio such that its pressure cannot be increased by using the presently available pumping means.

This effluent is introduced into a gas-liquid separating element 2, which is preferably adapted to carry out this gas-liquid separation withuot any substantial pressure decrease. The separating element 2 delivers into a pipe 8 at least the liquid fraction of the petroleum effluent. In other words the separating element 2 is adapted to deliver a diphasic fluid whose gas/liquid volumetric ratio is at most equal to the maximum value of the volumetric ratio of the diphasic fluid mixture which can be processed by the pumping element 9 whose inlet orifice is connected to a separating element 2 by pipe 8. The pumping element 9 is adapted to increase the pressure of the diphasic fluid and to reduce the value of the volumetric ratio of this fluid preferably to a zero value, i.e. to a value for which the whole gas amount feeding pumping element 9 is dissolved in the liquid phase.

Simultaneously the remaining fraction of the gas delivered by element 2 is transmitter through a pipe 10 to an element 11 capable of increasing the pressure of this gas to a value substantially equal to the pressure of the liquid delivered by pumping element 9.

A fraction of the gas leaving element 11 is supplied through a pipe 7a to a mixing element 6 which also receives from pipe 12 the pressurized fluid delivered by pumping element 9.

Mixing element 6 produces a diphasic fluid of a predetermined volumetric ratio, this fluid being transmitted through pipe 8a to a pumping element 9a similar to pumping element 9, i.e. increases the pressure of the diphasic fluid and reduces its gas/liquid volumetric ratio preferably to a zero value.

If the whole amount of gas delivered by element 2 is not dissolved in the liquid, the residual gas amount is supplied through a pipe 10a to a pressure increasing element 11a and is thereafter admixed with the liquid delivered through pipe 12a by pumping element 9a, into a mixing element 6a whose outlet orifice is connected to another pumping element 9b, etc.

When substantially all the gas is dissolved in the liquid, the resulting mixture is introduced into the (not shown) conveying pipe to be delivered to the utilization site, where vaporization of the dissolved gas can be obtained by decompression followed with the separation of this gas from the liquid.

It is thus apparent that, in the case of petroleum effluents, the method according to the invention permits recovery of the gas fraction of these effluents, without requiring any additional conduit for conveying this gas fraction.

Pumping elements, such as those designated by references 9, 9a, 9b . . . may be of any known type. However for building a compact apparatus which requires a minimum number of pumping elements, it will be preferable to use helico-axial pumps of the type described in the specification of French Pat. No. 2,333,139, capable of increasing the pressure of diphasic fluids having a higher volumetric gas/liquid ratio than the diphasic fluids processed by conventional pumping means.

Elements such as 11, 11a . . . for increasing the gas pressure may be of any known type, for example compressors, or alternatively of the type described in my U.S. patent application Ser. No. 11,818, filed Feb. 13, 1979 entitled "Method and Device for Conveying an Essentially Gaseous Fluid through a Pipe."

Figure 2:
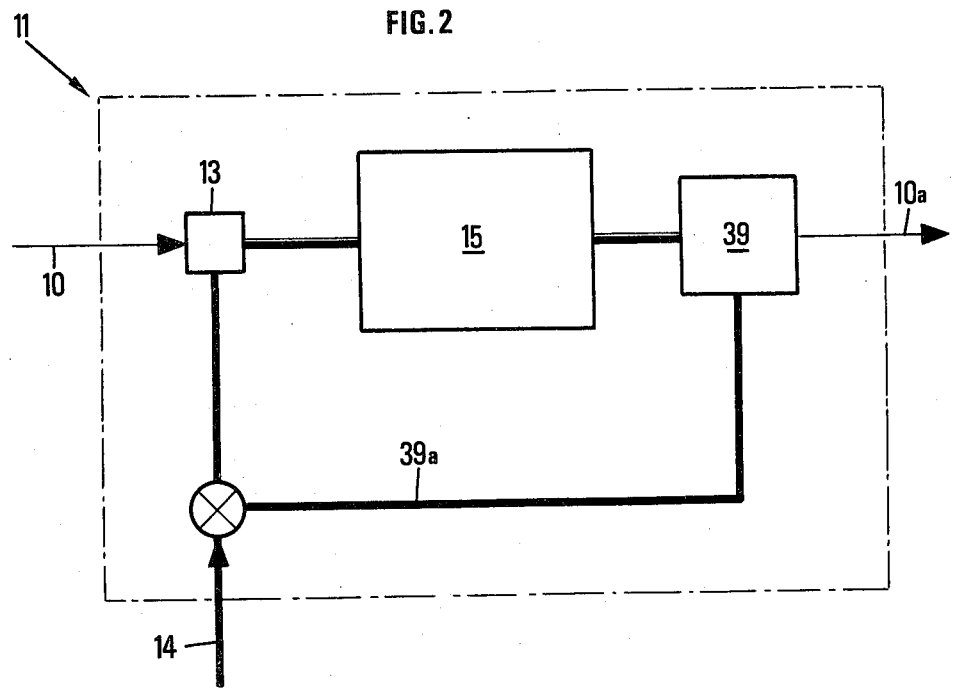
FIG. 2 shows an embodiment of a device for increasing the gas pressure.

Briefly, as shown in FIG. 2, element 11 comprises a mixer 13 which receives the gas from pipe 10 and a sufficient amount of an auxiliary liquid which may be, for example, a fraction of the liquid delivered by the separating element 2 or which results from a chemical modification of the gas produced by separating element 2, this auxiliary liquid being introduced at 14. Mixer 13, which may, for example, be of the type illustrated in FIG. 4 of said U.S. patent application Ser. No. 11,818 delivers a diphasic fluid into a suitable pumping element 15, which may, for example, be a helico-axial pump, as above indicated. Optionally a separator 39 similar to separator 2, will permit recovery of the auxiliary liquid which may be recycled into mixer 13 through pipe 39a.

Figure 3:
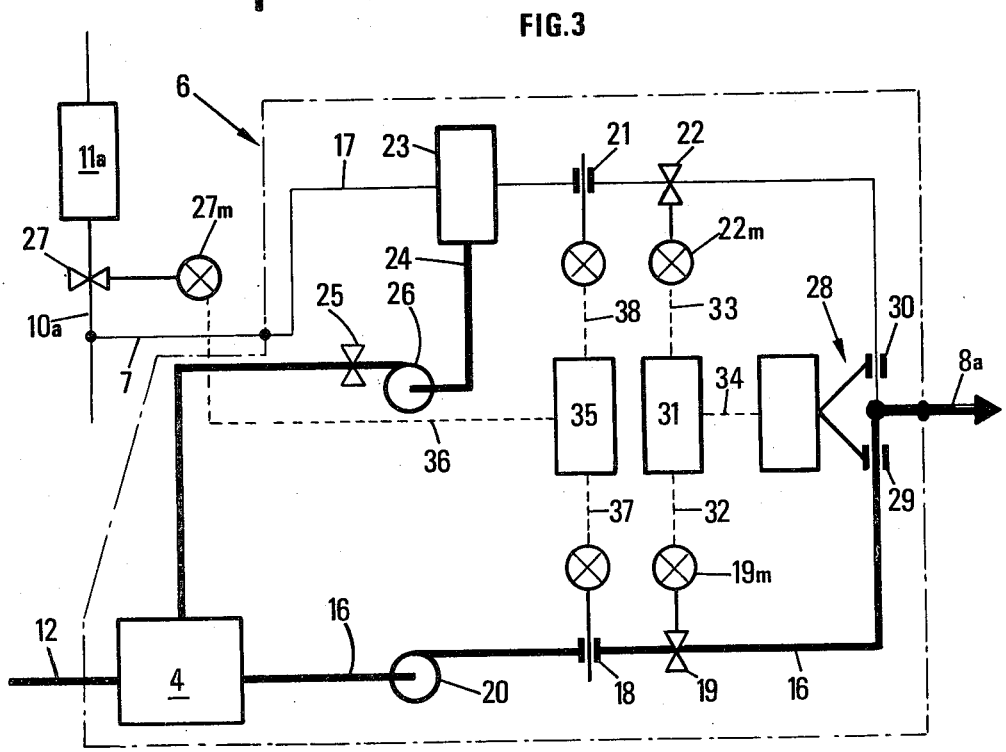
FIG. 3 illustrates an embodiment of the mixing element.

Mixing element 6, 6a . . . may be of any known suitable type. A non limitative embodiment of this mixing element is illustrated by FIG. 3.

This mixing element comprises pipes 16 and 17 which respectively connect pipes 7 and 12 to pipe 8a.

In series with pipe 16 are connected an element 18 for measuring the volume (or flow rate) of liquid flowing through pipe 16, an element 19 creating an adjustable pressure drop, and optionally a pump 20 ensuring liquid circulation in this pipe and a buffer tank 4.

In series with pipe 17 are connected an element 21 for measuring the volume (or flow rate) of gas flowing through pipe 17, an element 22 creating an adjustable pressure drop, and optionally a drain tank 23 wherein the liquid fraction which might be contained in the gas flow can be recovered by gravity, the bottom of this tank being connected to a drain pipe 24 having valve means 25 for partial or full closure or pipe 24, and optionally having a pump 26. Adjustment of the degree of opening of the obturating element or valve means 25 and control of the operation of pump 26 may be achieved automatically and sequentially, for example by a (not shown) device for sensing the liquid level in tank 23. In the embodiment illustrated in FIG. 3, pipe 24 connects tank 23 to liquid tank 4.

Mixing element 6 is also provided with means diagrammatically indicated at 28, comprising, for example, two pressure sensors 29 and 30 which respectively measure the pressure in pipes 16 and 17 immediately before their connection to pipe 8a, these means 28 being adapted to deliver a signal representing the difference of the respective pressures measured by sensors 29 and 30.

Elements 19 and 22 for creating pressure drops in the fluid are automatically set to the desired position by motor means diagrammatically shown at 19m and 22m. These motor means are energized by a control element 31 to which they are connected through transmission lines 32 and 33 respectively, this control circuit being responsive to the signal delivered by element 28 and transmitted through line 34.

Mixing element 6 also comprises an element 27 creating an adjustable pressure drop in the gas flowing through pipe 10a and element 11a adapted to increase the gas pressure.

Element 27 creating a pressure drop is automatically set to the desired position by motor means 27m actuated by a control element 35 which transmits a control signal through line 36 in relation with the signals delivered by the measuring elements 18 and 21 and transmitted through lines 37 and 38.

During the operation, the liquid and gas are supplied to the mixing element 6 at substantially the same pressure $P_E$ and the diphasic fluid is delivered to pipe 8a at pressure $P_S$ which is generally slightly lower than $P_E$.

Element 28 delivers a signal representative of the difference between the respective pressures in pipes 16 and 17, immediately before their connection to pipe 8a. In dependence with this signal, control element 31 actuates motor means 19m and 22m which adjust elements 19 and 22 creating pressure drops, so that the pressure difference measured by element 28 is reduced and can be nullified.

Simultaneously the flow rates (or volumes) of gas and liquid flowing through pipes 16 and 17 are measured by elements 18 and 21 respectively, delivering signals representative of these flow rates which are transmitted to control element 35.

The latter generates a signal controlling the motor means 27m which adjusts element 27 creating a pressure drop, so that the ratio of the gas flow rate to the liquid flow rate remains substantially constant at a preselected value substantially equal to the ratio of the gas to liquid volume which should be obtained for conveying the diphasic fluid through the pipe.

Thus when the ratio of the signals produced by the elements 21 and 18 is greater than a predetermined value corresponding to the value of the gas to liquid volumetric ratio which should be obtained for conveying the diphasic fluid through pipe 8a, control element 35 reduces the value of the pressure drop at 27 thereby increasing the gas flow rate through pipe 10a and consequently reducing the gas flow rate through pipe 17.

On the contrary, when the ratio of the signals delivered by elements 21 and 18 is lower than the preselected value, the control element 35 increases the pressure drop at 27, thus reducing the gas flow rate through pipe 10a and correlatively increasing the gas flow rate in pipe 17.

In other words the mixing element 6 equalizes the gas and liquid pressures before mixing, by monitoring the values of the dynamic pressure drops in the gas and liquid flows in relation with the pressure difference between these respective flows, and also controls the gas flow rate in dependence with the gas to liquid volumetric ratio.

Measuring elements 18 and 21, for example flowmeters, elements 19, 22 and 27 for creating pressure drops, for example adjustable diaphragms, and pressure sensors 29 and 30 are well known to those of ordinary skill in the art and will therefore not be described here in detail, nor control elements 31 and 35.

The drain tank 23, in series with pipe 17, makes it possible to recover by gravity the liquid fraction which may be contained in the gas flow.

Figure 4:
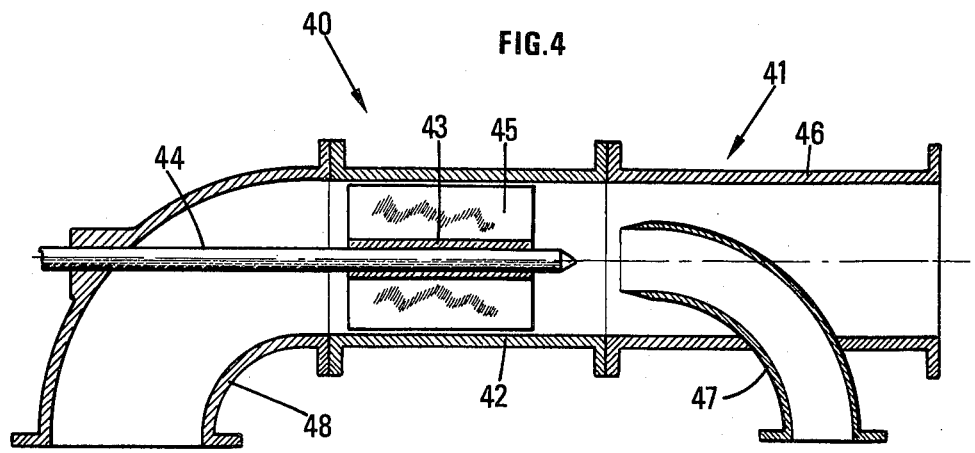
FIGS. 4 to 8 illustrate an embodiment of the gas-liquid separator.

The gas-liquid separator designated by reference 2 in FIG. 1 may be of any known type. FIG. 4 shows, by way of example, a possible embodiment of this separator which essentially comprises an active element 40 for driving the fluid in rotation in a plane perpendicular to the direction of flow and a distributing element 41 which separately delivers the gas and the liquid.

Figure 5:
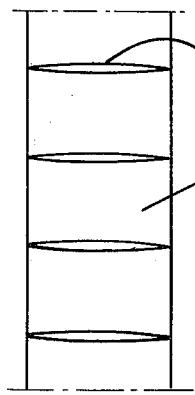

The active element 40 comprises a tubular body 42 housing a rotor 43 secured to the shaft 44 of a motor (not shown) for rotation. This rotor carries blades 45 which, as illustrated by FIGS. 5, 6 and 7, representing developed views of this rotor, may be of plane configuration and extend radially, inclined to the axis of rotation (FIG. 6) or curved thereto (FIG. 7)

Figure 6:
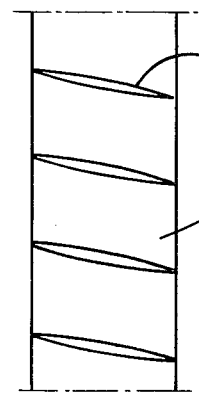
Figure 7:
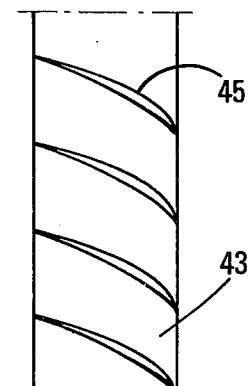

In the embodiments of FIGS. 6 and 7 the angle of inclination of blades 45 to the axis of rotation of rotor 43 is determined in relation to the axial rate of flow and in relation to the running speed of rotor 43.

As a result of the action of the centrifugal force developed by the rotation, the liquid and gas phase are separated, the gas phase being maintained near the flow axis, while the liquid phase, of higher density is located at a distance from the rotor axis.

The ends of rotor 43 may optionally be streamlined to substantially avoid any disturbance in the flow.

Under these conditions, as shown in FIG. 4, the distributing element 41 is formed of two tubes 46 and 47, the smaller of these tubes collecting substantially only gas. These two tubes are coaxial over a portion of their length and are respectively connected to pipes 8 and 10 (FIG. 1). At the outlet of tube 46 is then collected the whole liquid phase to which is optionally added the portion of gas phase which has not been collected by tube 47.

The diphasic fluid is introduced into the assembly 40–41 by a connecting pipe 48 connected to pipe 1.

Figure 8:
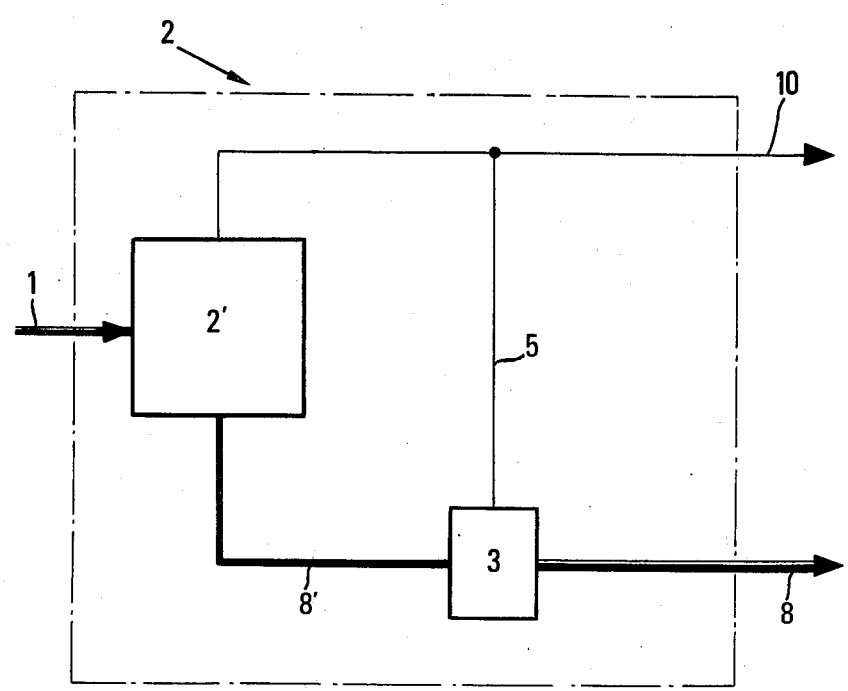

FIG. 8 diagrammatically illustrates another embodiment of the separating element of FIG. 1. This embodiment comprises a separator 2' delivering the whole gas phase of diphasic flow 1 to pipe 10, and the whole liquid phase to pipe 8'. The latter is connected to pipe 8 through a mixer 3 which simultaneously receives the gas delivered by separator 2' through pipe 5 and delivers a diphasic fluid of predetermined gas/liquid volumetric ratio.

Changes may be made without departing from the scope of the present invention.

The embodiment of element 40 illustrated by FIG. 4 comprises only one rotor, but it is also possible to use two distinct rotors rotated by two separate motors whose rotation speed can be continuously varied.

Moreover it is possible to use a separator 2 of any known type which delivers to pipe 8 only the liquid phase of the flow from pipe 1. Pumping element 9, which may then be of any known type, increases the pressure of the liquid which then becomes under saturated with gas. A sufficient gas amount is fed from mixer 6 into this under-saturated liquid to obtain a saturated liquid in pipe 8a. A further pressure increase performed by pump 9a causes under-saturation of the liquid wherein a further gas amount can thus be dissolved. This fluid processing may be continued until complete dissolution of the gas in the liquid phase.

I claim:

1. A method of simultaneously conveying through the same pipe both the liquid and gas components of a diphasic fluid of a gas/liquid volumetric ratio of at least 10% of gas, comprising separating from the diphasic fluid a liquid of reduced free gas content from a residual gas, said liquid comprising the liquid component of said diphasic fluid, carrying out the series of the following steps at least once, in order to obtain a new a diphasic fluid having a limited free gas content lower than a specified value, said series of the following steps comprising:
    (a) increasing the pressure of said liquid of reduced free gas content;
    (b) independently simultaneously increasing to the same value the pressure of the residual gas, and
    (c) producing a new diphasic fluid of redcuced free gas content by admixing said liquid of reduced free gas content with said residual gas; said new diphasic fluid being introduced into said conveying pipe and conveyed therethrough.

2. A method according to claim 1, wherein the pressure of said liquid of reduced free gas content and said residual gas being separated is not substantially reduced.

3. A method according to claim 1, comprising performing said step of increasing the pressure of said liquid of reduced free gas content with pumping means, wherein said new diphasic fluid has a limited free gas content at most equal to said specified value.

4. A method according to claim 3, further comprising increasing the pressure of said new fluid before its introduction into the pipe for conveying therethrough.

5. A device for simultaneously conveying through the same pipe both the liquid and gas components of a diphasic fluid of a gas/liquid volumetric ratio of at least 10% of gas, said device comprising:
    separating means for receiving a first diphasic fluid flow for separating the gas component from the liquid component of said first diphasic fluid without a substantial reduction in pressure, said separator having a first outlet orifice for delivering at least the entire amount of the liquid component of said first diphasic fluid and a second outlet or orifice for delivering at least a fraction of said gas component;
    first pumping means having an inlet orifice connected to said first orifice of said separating means for receiving said liquid component and for increasing the pressure thereof, second pumping means having an inlet orifice connected to said second orifice of said separating means for receiving said fraction of said gas component and for increasing the pressure thereof, and mixing means having inlet orifices respectively connected to said first pumping means and second pumping means for receiving and mixing said increased pressure liquid component and said increased pressure fraction of said gas component under substantially constant pressure conditions; and
    said mixing means comprising equalizing means for substantially equalizing, before mixing, the pressures of said fraction of said gas component and of said liquid component delivered to said mixing means, and control means for controlling the amount of mixed gas as a function of the amount of liquid, in relation to a specified value of the gas/liquid volumetric ratio which must be obtained.

6. A device according to claim 5, comprising a plurality of said processing means connected in series.

7. A device according to claim 5, wherein said first pumping means is adapted for increasing the pressure of diphasic fluids whose gas/liquid volumetric ratio is at most equal to a specified value, and wherein said separator is adapted for delivering through its first orifice a diphasic fluid whose gas/liquid volumetric ratio is at most equal to said specified value.

8. A device according to claim 7, wherein said separating means has said first and second orifices located for simultaneously delivering all the liquid component through said first orifice and substantially all the gas component of the processed diphasic fluid through its second orifice, and wherein said separating means comprises secondary mixing means connected between said first orifice and the inlet orifice of said first pumping means and connected to said second orifice for receiving simultaneously gas from said second orifice of said separator, said secondary mixing means adapted for producing a diphasic fluid whose gas/liquid volumetric ratio has a value at most equal to said specified value.

9. A device according to claim 5, wherein said second pumping means comprises fluid producing means for producing a secondary diphasic fluid by mixing said fraction of said gas component with an auxiliary liquid supplied thereto, third pumping means for pumping and increasing the pressure of the resulting secondary component diphasic fluid and a gas liquid separator for receiving the secondary diphasic fluid after its pressure has been increased.

* * * * *